United States Patent [19]
Merkin et al.

[11] Patent Number: 5,297,805
[45] Date of Patent: Mar. 29, 1994

[54] SEALING RING

[75] Inventors: Robert A. Merkin; Thomas R. Smith; John G. Cechin, all of Nacogdoches County, Tex.

[73] Assignee: J.M. Clipper Corp., Denver, Colo.

[21] Appl. No.: 955,014

[22] Filed: Oct. 1, 1992

[51] Int. Cl.⁵ .............................................. F16J 15/18
[52] U.S. Cl. ................................ 277/124; 277/188 R; 277/205
[58] Field of Search ................................ 277/117–125, 277/188 R, 188 A, 205, 227

[56] References Cited

U.S. PATENT DOCUMENTS

| | | | |
|---|---|---|---|
| 2,553,750 | 5/1951 | Cole | 277/125 X |
| 2,706,655 | 4/1955 | Showalter | 277/124 |
| 2,907,614 | 10/1959 | Rosen | 277/188 R X |
| 2,951,721 | 9/1960 | Asp . | |
| 3,094,337 | 6/1963 | Pippert et al. . | |
| 3,158,376 | 11/1964 | Rentschler . | |
| 3,169,776 | 2/1965 | Felt | 277/125 |
| 3,467,394 | 9/1969 | Bryant | 277/125 X |
| 3,469,854 | 9/1969 | Linwood . | |
| 3,848,880 | 11/1974 | Tanner | 277/188 R X |
| 3,854,737 | 12/1974 | Gilliam, Sr. . | |
| 4,053,166 | 10/1977 | Domkowski . | |
| 4,219,204 | 8/1980 | Pippert | 277/188 A |
| 4,438,935 | 3/1984 | Lees | 277/205 |
| 4,468,042 | 8/1984 | Pippert et al. | 277/188 A |
| 4,630,636 | 12/1986 | Cutcher . | |
| 4,635,945 | 1/1987 | Beck | 277/125 X |
| 4,811,959 | 3/1989 | Bullard et al. . | |
| 4,886,241 | 12/1989 | Davis et al. . | |

FOREIGN PATENT DOCUMENTS

| | | | |
|---|---|---|---|
| 62-167977 | 7/1987 | Japan . | |
| 153673 | 3/1956 | Sweden . | |
| 1041916 | 9/1966 | United Kingdom | 277/188 R |

Primary Examiner—William A. Cuchlinksi, Jr.
Assistant Examiner—Scott W. Cummings
Attorney, Agent, or Firm—Dickstein, Shapiro & Morin

[57] ABSTRACT

A sealing ring for a seal assembly used in oil field equipment including an elastomeric body and a reinforced face. The reinforced face is of molded polytetrafluoroethylene and is integral with the elastomeric body to provide improved pressure capability for the seal without the need for backup rings. The elastomeric body is formed to have a waisted cross section with a narrower portion in the middle and a wider portion at each end. The wider ends provide multiple sealing surfaces and allow fewer rings to be used.

20 Claims, 5 Drawing Sheets 5,297,805

SEALING RING

BACKGROUND OF THE INVENTION

This invention relates in general to a sealing ring construction and more particularly to the components of fluid seal assemblies used to provide inner diameter and outer diameter sealing on oil field equipment.

It is common practice to use seal assemblies to form a fluid barrier on the inner diameter or exterior diameter of oil field equipment, such as gas lift valves, safety valves, and circulating tools. Typically, a seal assembly includes a center element, one or more sealing rings, and one or more backup rings. The sealing rings typically are V-shaped or Chevron type packing rings, which have a concave, V-shaped bottom surface, a convex top surface and straight sides. Such rings are commonly known as V-rings. An example of such an assembly is shown in U.S. Pat. No. 4,811,959. Multiple V-rings may be necessary to provide a sufficient number of sealing surfaces for an effective seal.

The service conditions for seal assemblies can vary widely in temperature, pressure and the type of liquid or gas being sealed. Temperatures can range from $-70°$ F. to $400°$ F., with pressures from atmosphere to 20,000 psi. To accommodate the varying service conditions, various materials and combinations of rings and backup rings are used. U.S. Pat. No. 4,811,959 describes a large variety of ring materials including fabric impregnated with rubber, asbestos with a plastic binder or elastomeric material, wire mesh, asbestos cord, ceramic fibers, and elastomeric materials wrapped with tetrafluoroethylene-propylene copolymer or terpolymer.

Multiple non-elastomeric backup rings may be used to give strength to the sealing rings in order to accommodate high pressures. Often, when the seal assembly is taken apart and reassembled for repair or other reasons, the backup rings are inadvertently left out or too few backup rings are replaced. Error in installation of the backup rings can result in excessive deformation and destruction of the V-rings and substantial wear, inefficient operation and leakage of the seal.

In view of the foregoing, a need exists for a seal assembly which can accommodate high pressures without the need for backup rings. Also, a need exists for a seal assembly which reduces the number of sealing rings necessary to provide an effective seal.

SUMMARY OF THE INVENTION

The present invention alleviates to a great extent the deficiencies of the prior art by providing a sealing ring comprising an elastomeric body and a reinforced face such that a portion of the ring is less flexible than the remainder of the ring.

In another aspect of the invention, the sealing ring has a waisted cross section such that the ring provides two distinct sealing surfaces on both the inner and outer diameters. Additionally, the two sealing surfaces can be provided by the elastomeric body and the reinforced face to create surfaces with different characteristics.

In another aspect of the invention, a plurality of sealing rings according to the present invention are stacked to provide a sealing assembly.

Therefore, it is an object of this invention to provide a sealing ring which can be used in high pressure situations without the need for backup rings. It is another object of the present invention to provide a sealing ring which requires fewer rings to provide an effective seal.

With these and other objects, advantages and features of the invention that may become apparent, the nature of the invention may be more clearly understood by reference to the following detailed description of the invention, the appended claims and the several drawings attached hereto.

DETAILED DESCRIPTION OF PREFERRED EMBODIMENTS

Figure 1:
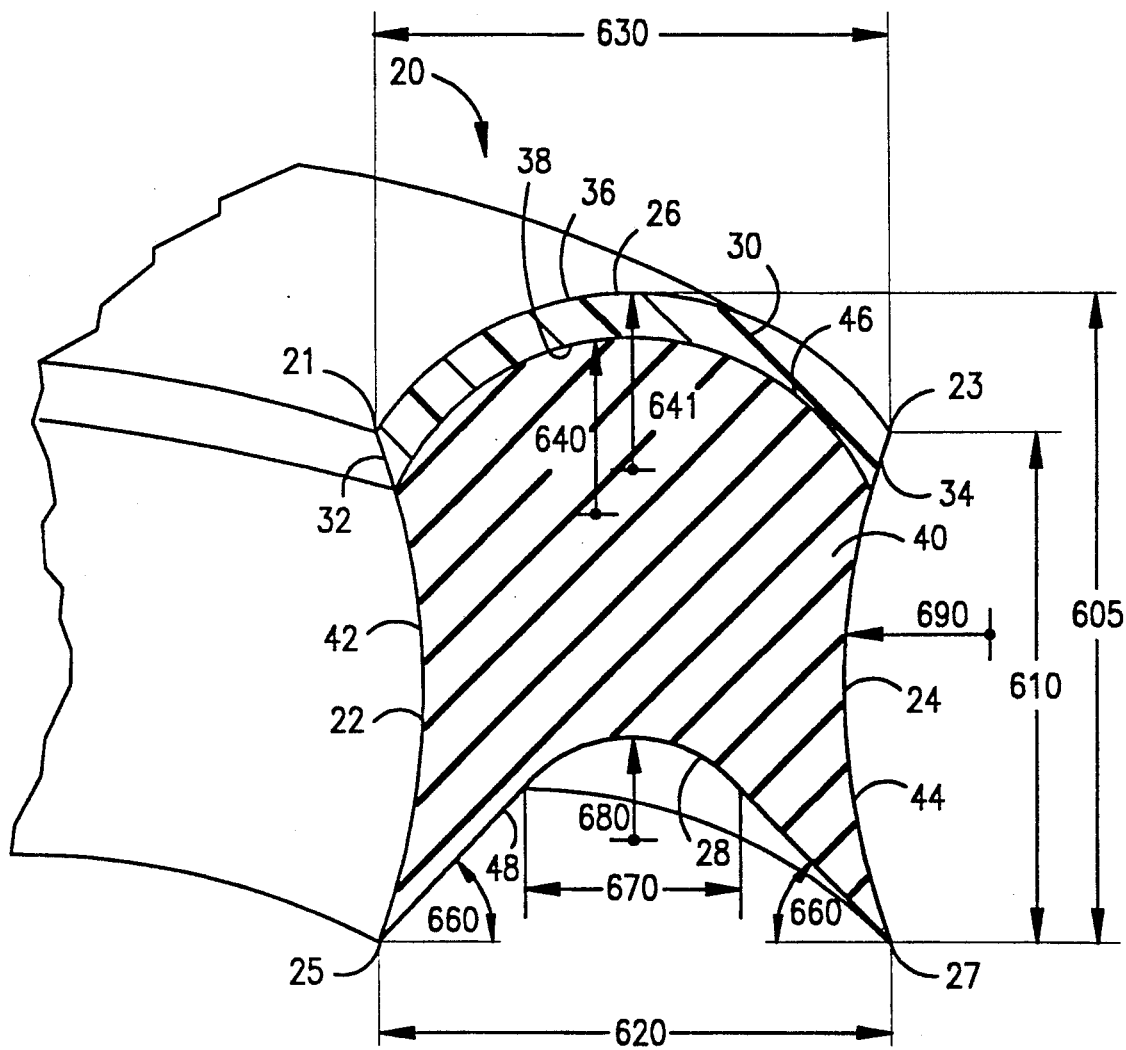
FIG. 1 is a cross-section view of a sealing ring according to a preferred embodiment of the present invention.

Referring now in detail to the drawings, there is illustrated in FIG. 1 a cross-section of a sealing ring 20 according to a preferred embodiment of the present invention. The sealing ring 20 is generally in the shape for V-ring type seals; it is formed of an elastomeric material with a V-shaped concave bottom 28 and a rounded convex top 26. The sealing ring 20 has a waisted crosssection, which means that both the inner surface 22 and the outer surface 24 of the sealing ring 20 are concave, so that the middle section has a smaller width than either the top or bottom.

The sealing ring 20 consists of two portions, an elastomeric body 40 and a reinforced face 30, which define its shape. The reinforced face 30 is attached at its bottom surface 38 to the top surface 46 of the elastomeric body 40. The reinforced face 30 provides a portion of the sealing ring 20 which is less flexible than the remainder of the sealing ring 20 formed by the elastomeric body 40. Additionally, the reinforced face 30 has a lower coefficient of friction than the body 40. Preferably, the reinforced face 30 is formed of molded polytetrafluoroethylene ("PTFE") and is adhered to the body 40 to be integral with the body 40.

The inner surface 22 of the sealing ring 20 is defined by the inner surface 32 of the reinforced face 30 and the inner surface 42 of the elastomeric body 40. Similarly, the outer surface 24 of the sealing ring is defined by the outer surface 34 of the reinforced face 30 and the outer surface 44 of the elastomeric body 40. The waisted cross section of the sealing ring 20 provides two ring-shaped contact areas on both the inner surface 21, 25 and the outer surface 23, 27. The combination of the reinforced face 30 and the waisted cross section creates contact areas with different characteristics on both the inner surface 22 and the outer surface 24 of the sealing ring 20. The top contact areas 21, 23 are formed by the reinforced face 30. The bottom contact areas 25, 27 are formed by the elastomeric body. The use of two inner and outer sealing surfaces and the different characteristics of the sealing surfaces reduces the number of sealing rings needed to provide an effective seal.

When compressed, the reinforced face 30, which is less flexible, is subject to less deformation than the elastomeric body. The shape of the ring is maintained without the need for backup rings. Further, the deformation causes the contact areas 21, 23, 25, 27 to press against the sealed pipes or tools, which provides more surface contact and a stronger seal.

Physical properties of the two materials complement each other such that the lower coefficient of friction of the face can allow a greater force to be applied to the inner diameter and or outer diameter to the equipment being sealed by the face without increasing the actuating drag between the components. This allows more surface contact and a stronger seal for gases and fluids with one arrangement. Therefore, the sealing ring according to the present invention can withstand greater pressures.

Figure 2:
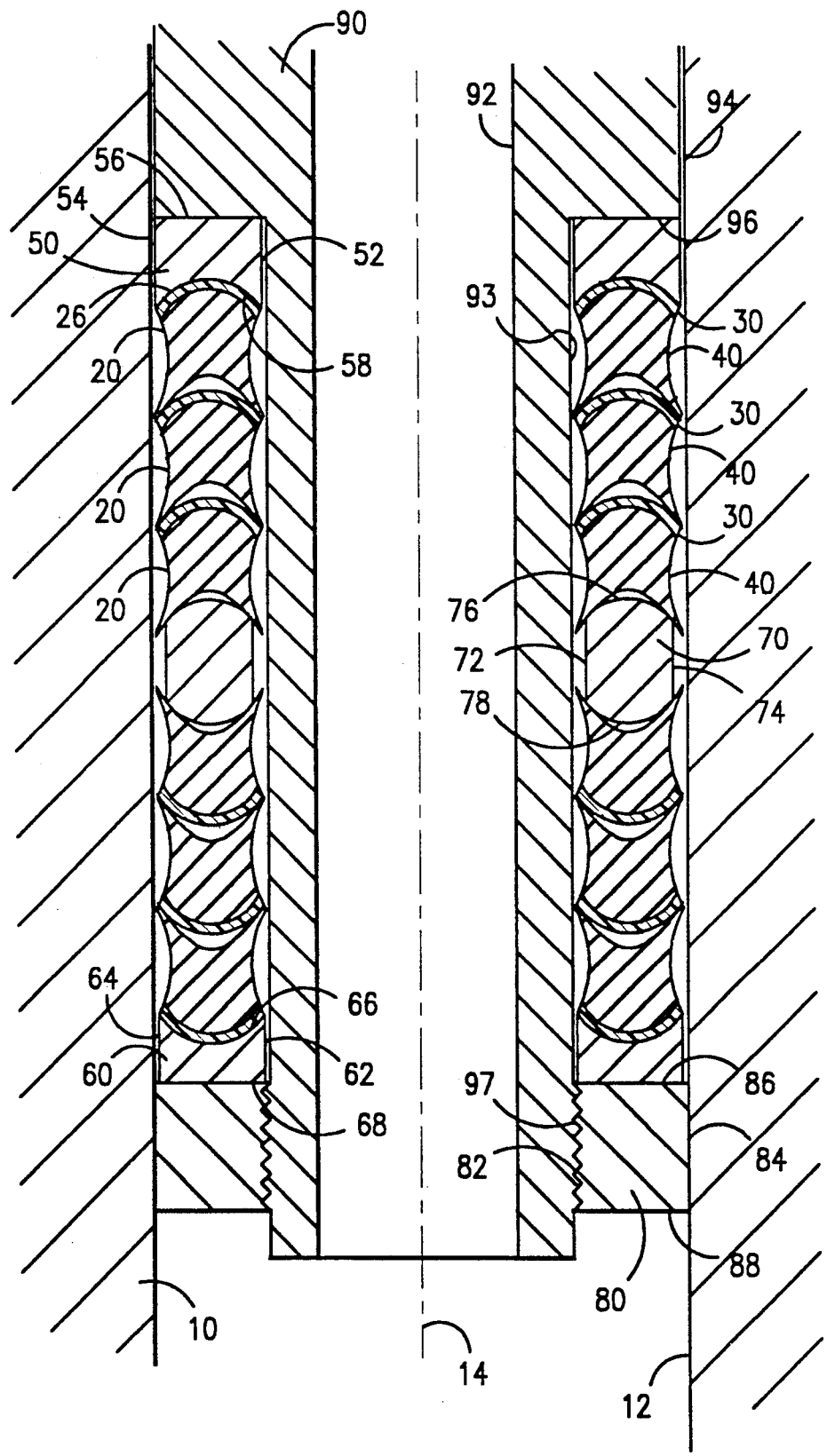
FIG. 2 is a cross-section view of a preferred embodiment of a seal assembly according to the present invention using the sealing ring of FIG. 1.

FIG. 2 illustrates a cross-section of a seal assembly composed of sealing rings according to a preferred embodiment of the present invention. The seal assembly is disposed between an inner tool 90 and an outer tool 10 to form a fluid barrier. The inner tool and outer tool can be parts of a gas lift valve, safety valve, well pump, circulating tool or other oil field equipment. Depending upon the type of tools, the seal assembly is maintained in position by supports on either the inner or outer tool. As illustrated in FIG. 2, the inner tool includes a seal assembly support 96 created by an area of reduced width on the inner tool. The seal assembly is also bounded by a second seal assembly support formed by the upper surface of a nut 80 attached to a threaded portion 97 of the inner tool. In this construction, the inner tool 90 and seal assembly, can slide or rotate within a bore 12 of the outer tool 10. The seal assembly supports could also be formed by or attached to the outer tool 10. Alternatively, if the inner tool 90 and outer tool 10 do not move relative to each other, seal supports could be located on both tools.

As in general construction, the seal assembly consists of a header 70, a plurality of sealing rings 20 and a plurality of followers 50, 60. The header 70 forms a central element of the seal assembly and is generally of a metallic or other non-elastomeric material. The header top 76 and header bottom 78 are rounded or V-shaped so as to fit within the sealing ring bottom 28.

A plurality of sealing rings 20 according to the present invention are stacked on either side of the header 70. The body 40 of each ring contacts the reinforced face 30 of an adjacent ring. The sealing rings on one side of the header 70 are oriented oppositely to the sealing rings on the other side of the header.

A metallic follower 50 is interposed between the last sealing ring on one side of the seal assembly and the seal assembly support 96. The follower 50 has a concave bottom surface 58 to contact the convex top 26 of the sealing ring. A second metallic follower 60 is interposed between the last sealing ring on the other side of the seal assembly and the seal assembly support 86 of the nut 80. The top 66 of this follower is concave to contact the convex top 26 of the inverted sealing ring 20.

No backup rings are necessary between the sealing rings 20 and the metallic followers 50, 60. The reinforced faces 30 of the sealing rings 20 function similar to backup rings to increase the pressure capability of the sealing assembly. When under pressure, the top contact areas 21, 23 which are part of the reinforced face 30 spread out against the inner tool 90 and the outer tool 10. The elastomeric body is, therefore, prevented from extending past the reinforced face 30. This eliminates the possibility of installation errors regarding the use of backup rings, which can prevent proper operation of the seal assembly.

Figure 3:
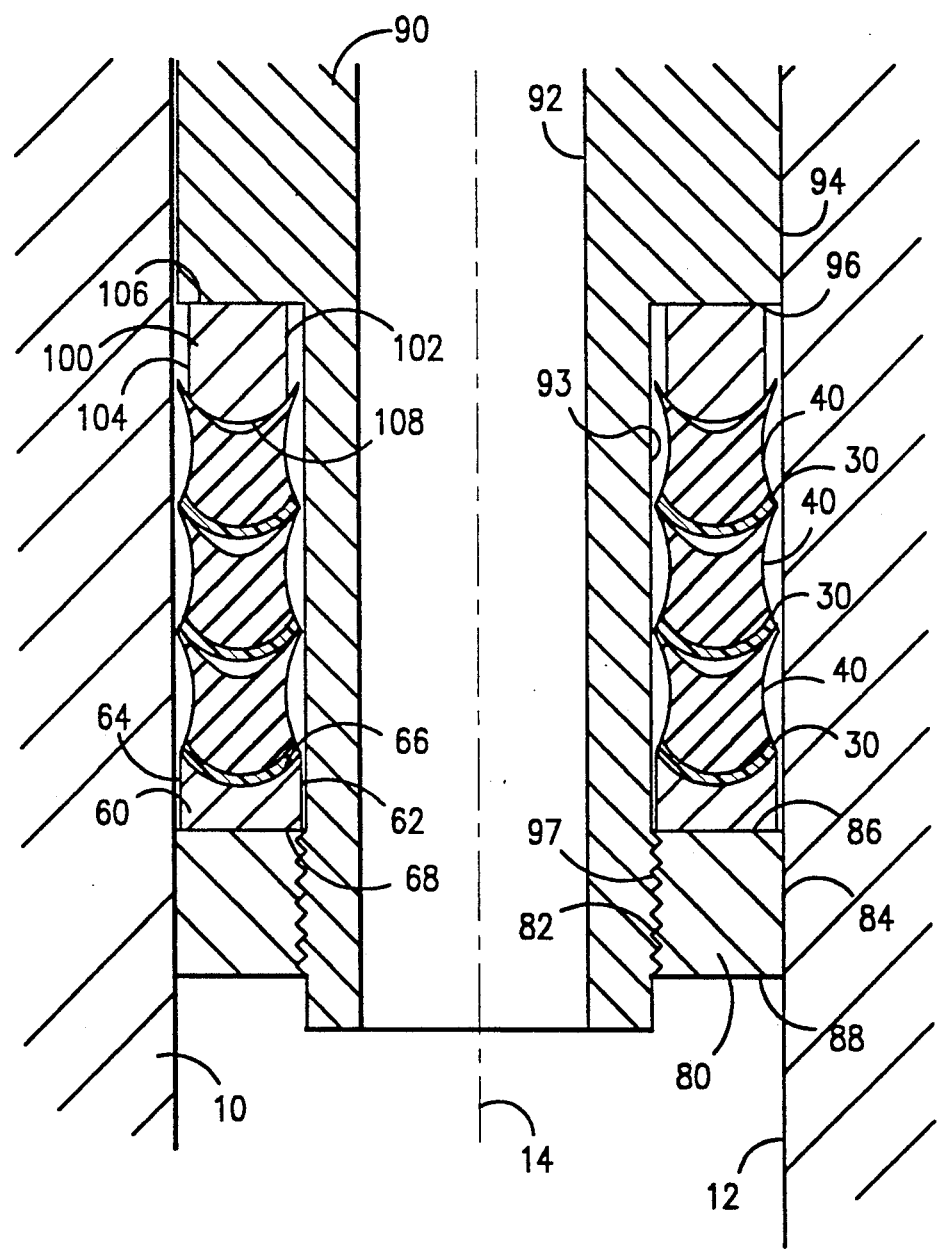
FIG. 3 is a cross-section view of a second preferred embodiment of a seal assembly according to the present invention using the sealing ring of FIG. 1.

FIG. 3 illustrates a cross-section of a second seal assembly composed of sealing rings according to a preferred embodiment of the present invention. Again, the seal assembly is disposed between an inner tool 90 and an outer tool 10. The seal assembly is bounded by supports 96, 86 formed by or attached to the inner tool 90 or the outer tool 10. As illustrated in FIG. 3, the seal assembly header 100 has a flat top 106 which rests against the upper seal assembly support 96. The header bottom 108 is rounded or V-shaped to fit within the sealing ring bottom 28. A plurality of sealing rings 20 are stacked on one side of the header so that the body 10 of each ring contacts the reinforced face 40 of the adjacent ring. A single metallic follower 60, which has a concave top 66, contacts the reinforced face 30 of the last ring 20 opposite the header 100. This seal assembly functions in a similar manner to the seal assembly illustrated in FIG. 2 and, thus, no backup rings are necessary.

The dimensions of the sealing ring would depend upon the inner and outer diameters of the tools being sealed. However, by way of example, in a preferred embodiment, a sealing ring, as shown in FIG. 1, having an inner diameter of 0.719 inches and an outer diameter of 1.031 inches has a width of approximately 0.180 inches at its widest points 620, 630 and a total height 605 of 0.204 inches. The distance 610 between the top contact areas 21, 23 and the bottom contact areas 25, 27 is approximately 0.1609 inches. The sides 22, 24 of the sealing ring which form the waisted cross section are defined by an arc 690 having a radius of curvature of 0.2216 inches. The outer surface 36 and inner surface 38 of the reinforced face 30 are parallel curves 640, 641, each having a radius of curvature of approximately 0.1 inches. The bottom 28 of the sealing ring is defined by two angled side portions at angles 660 of approximately 45 degrees. The center of the bottom 670, defined by the area between points approximately 0.051 inches from each side, is defined by an arc 680 having a radius of curvature of approximately 0.05 inches. Naturally, these dimensions would be adjusted based upon the width and height of the sealing ring.

Figure 4:
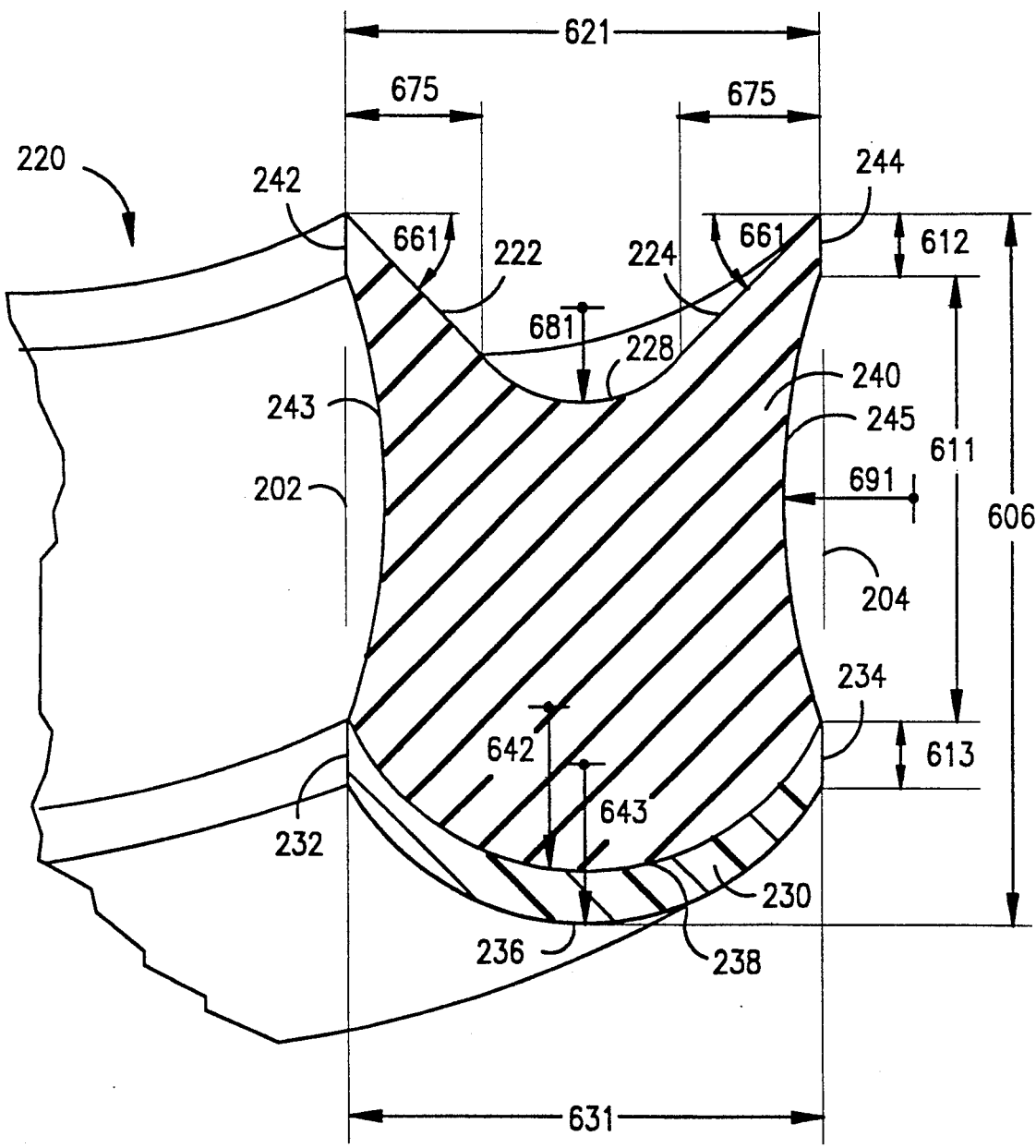
FIG. 4 is a cross-section view of a sealing ring according to a second preferred embodiment of the present invention.
Figure 5:
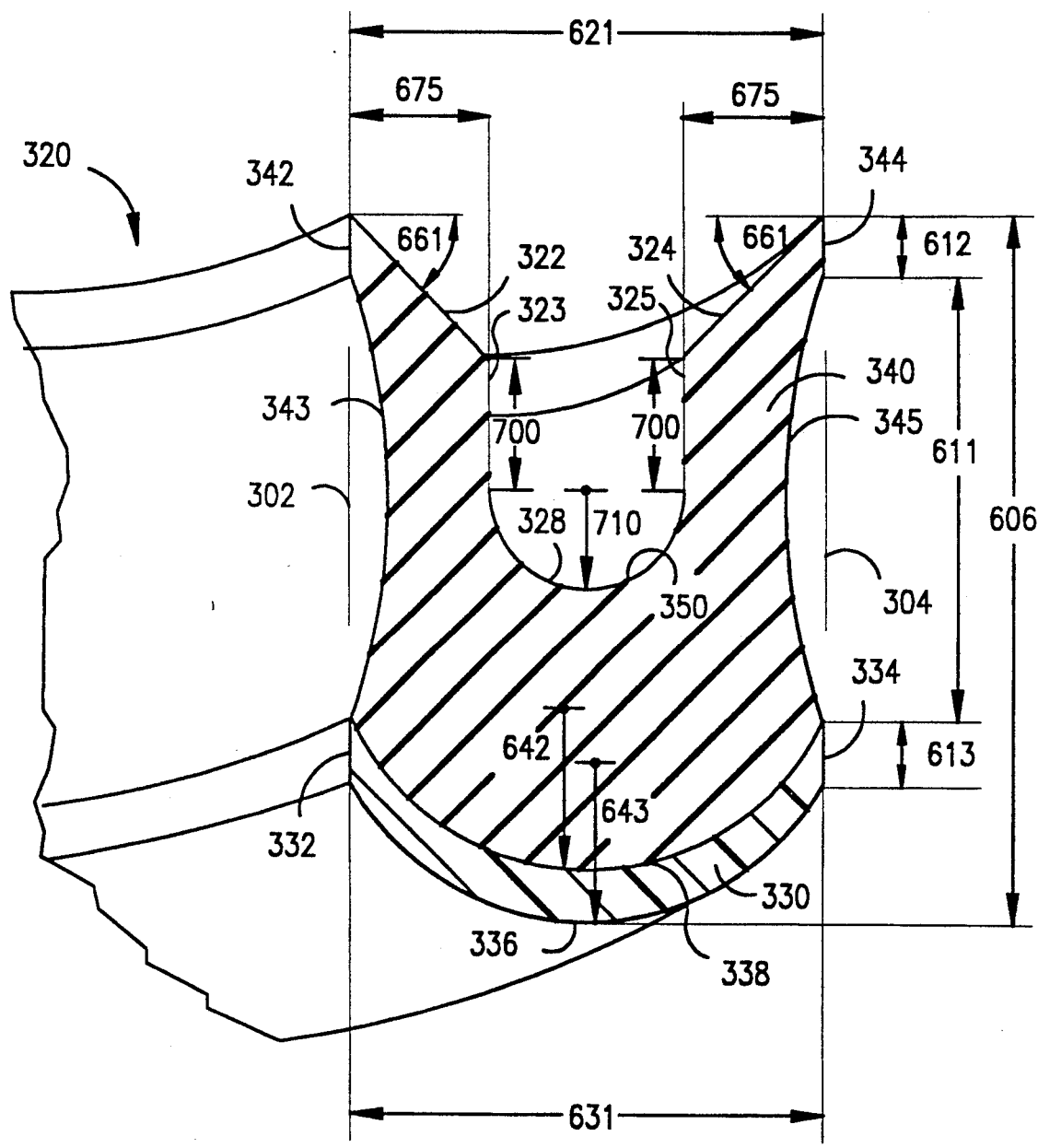
FIG. 5 is a cross-section view of a sealing ring according to a third preferred embodiment of the present invention.

FIGS. 4 and 5 illustrate additional embodiments of sealing rings according to the present invention having slightly different cross-sectional shapes and dimensions. In FIG. 4, the lower contact areas 242, 244 are defined by flat sections along the sides 202, 204 of the sealing ring. In this embodiment, with a sealing ring of dimensions similar to those illustrated with respect to FIG. 1, the contact areas 242, 244 would be approximately 0.03 inches 612. Similarly, the top contact areas 232, 234 of the reinforced face 2 also have flat sections along the sides 202, 204 of the sealing ring of approximately 0.03 inches 613. The flat sections defining the top contact areas 232, 234 and the bottom contact areas 242, 244 are separated by a distance 611 of approximately 0.1679 inches. The sealing ring has a total height 606 of 0.262 inches. In the area between the flat sections, the waisted cross section of the sealing ring has a concave side defined by an arc 691 having a radius of curvature of approximately 0.242 inches. The reinforced face 230 has an outer surface 236 and an inner surface 238 which are parallel and each are defined by arcs 642, 643 each having a radius of curvature of approximately 0.125 inches. The bottom 228 of the sealing ring is formed like the embodiment illustrated in FIG. 1. Two angled side portions 222, 224 are at angles 661 of 45 degrees. The center section 228, which covers an area between points 0.051 inches from each side 675, is defined by an arc 681 having a radius of curvature of 0.05 inches.

FIG. 5 illustrates a third embodiment which is similar to the embodiment of FIG. 4 on the top and sides. This embodiment has a notched portion 350 in the bottom of the sealing ring. The top contact areas 332, 334 and bottom contact areas 342, 344 have flat sections along the sides 302, 304 of the sealing ring. On the bottom of the sealing ring, two angled side portions 322 and 324 are formed at angles 661 of 45 degrees. These side portions end approximately 0.051 inches from the bottom contact areas 675. Two parallel side walls 323, 325 extend into the body 340 of the sealing ring approximately 0.039 inches 700. The side walls are connected by a semicircular center section 328 having a radius 710 of 0.035 inches to complete the bottom of the sealing ring. In this embodiment, the bottom contact areas are spread further apart to press against the walls of the inner tool and outer tool as the reinforced face 330 of the ring below presses into the notched portion of the bottom of the sealing ring.

Although preferred embodiments are specifically illustrated and described herein, it will be appreciated that modifications and variations of the present invention are covered by the above teachings and within the purview of the appended claims without departing from the spirit and intended scope of the invention.

What is claimed as new and desired to be protected by Letters patent of the United States is:

1. A sealing ring, comprising:
   an elastomeric body having a waisted cross section; and
   a reinforced face such that a portion of said sealing ring is less flexible than the remainder of said sealing ring;
   wherein said elastomeric body provides a first set of contact surfaces for forming a seal, and wherein said reinforced face provides a second set of contact surfaces for forming a seal distinct and spaced apart from said first set of contact surfaces.

2. The sealing ring of claim 1, wherein said reinforced face is integrally attached to said elastomeric body.

3. The sealing ring of claim 1, wherein said elastomeric body has a convex side and a concave side opposite said convex side.

4. The sealing ring of claim 3, wherein said convex side includes said reinforced face.

5. The sealing ring of claim 1, wherein said reinforced face is formed of polytetrafluorethylene.

6. A sealing assembly, comprising:
   a plurality of sealing rings, wherein at least one of said sealing rings includes
   an elastomeric body having an waisted cross section, and
   a reinforced face such that a portion of said at least one sealing ring is less flexible than the remainder of said at least one sealing ring;
   wherein said elastomeric body of said at least one sealing ring provides a first set of contact surfaces for forming a seal, and wherein said reinforced face of said at least one sealing ring provides a second set of contact surfaces for forming a seal distinct and spaced apart from said first set of contact surfaces.

7. The sealing assembly of claim 6, further comprising a header ring.

8. The sealing assembly of claim 7, wherein said header ring is formed of a non-elastomeric material.

9. The sealing assembly of claim 7, wherein at least one sealing ring is located on each side of said header ring.

10. The sealing assembly of claim 9, wherein said sealing rings on one side of said header ring are oriented in an opposite direction to said sealing rings on the other side of said header ring.

11. The sealing assembly of claim 9, wherein the number of sealing rings on one side of said header ring is equal to the number of sealing rings on the other side of said header ring.

12. The sealing assembly of claim 7, further comprising at least one follower ring.

13. The sealing assembly of claim 9, further comprising at least two follower rings, wherein at least one follower ring is located outside said sealing rings on each side of said header ring.

14. The sealing assembly of claim 12, wherein said at least one follower ring is formed of metal.

15. The sealing assembly of claim 6, wherein said sealing rings are V-rings.

16. The sealing assembly of claim 6, wherein said reinforced faces are formed of polytetrafluoroethylene.

17. A sealing ring, comprising:
    an elastomeric body having a waisted cross section; and
    a reinforced face such that a portion of said sealing ring is less flexible than the remainder of said sealing ring;
    wherein said elastomeric body provides a first set of contact surfaces for forming a seal, and wherein said reinforced face provides a second set of contact surfaces for forming a seal distinct and spaced apart from said first set of contact surfaces; and
    wherein at least one of said first set of contact surfaces and said second set of contact surfaces is substantially flat and parallel to an axis of said sealing ring.

18. The sealing ring of claim 17, wherein said second set of contact surfaces is flat.

19. The sealing ring of claim 17, wherein said first set of contact surfaces is flat.

20. The sealing ring of claim 17, wherein said elastomeric body has a notched portion on a bottom surface.

* * * * *